United States Patent [19]

Frost

[11] Patent Number: 5,456,642
[45] Date of Patent: * Oct. 10, 1995

[54] GEARED TRACTION UNIT

[75] Inventor: Barry L. Frost, Waterford, Mich.

[73] Assignee: New Venture Gear, Inc., Troy, Mich.

[*] Notice: The portion of the term of this patent subsequent to Oct. 25, 2011, has been disclaimed.

[21] Appl. No.: 76,008

[22] Filed: Jun. 11, 1993

[51] Int. Cl.$^6$ .............................. F16H 47/04; F16H 13/06
[52] U.S. Cl. .............................................. 475/93; 475/159
[58] Field of Search .................. 475/159, 84, 85, 475/89, 90, 91, 93

[56] References Cited

U.S. PATENT DOCUMENTS

| | | | |
|---|---|---|---|
| 2,454,694 | 11/1908 | Gregg | 475/91 |
| 2,743,628 | 5/1956 | Scharaffa | 475/91 |
| 4,084,654 | 4/1978 | Dudek . | |
| 4,157,668 | 6/1979 | Fukuma et al. | 475/159 X |
| 4,389,908 | 6/1983 | Dudek . | |
| 4,472,984 | 9/1989 | Cook . | |
| 4,882,950 | 11/1989 | Gausrab et al. . | |
| 4,916,973 | 4/1990 | Fuelberth et al. . | |
| 4,944,195 | 7/1990 | Takahashi et al. | 475/159 X |
| 5,147,252 | 9/1992 | Mace et al. | 475/85 X |

OTHER PUBLICATIONS

"PDS (Porsche Dynamic Slip Control Clutch)-A New Inter-Axle Coupling Device For 4WD-Cars", Müer et al., SAE Paper No. 880698, Copyright 1988.
"Meshed Planetary Trains Give Gear Limited Slip Differential", Design News, Mar. 22, 1976, pp. 96–97.
TrueTrac Sales Literature, "Torque Proportioning Differential", 1979 Tractech, Inc.

Primary Examiner—Edward K. Look
Assistant Examiner—Hoang Nguyen
Attorney, Agent, or Firm—Harness, Dickey & Pierce

[57] ABSTRACT

A geared torque transfer device is provided having a planetary type gear arrangement disposed within a housing that is substantially filled with a viscous fluid. Rotation of the planetary gear members within the housing in response to differential input and output rotational velocity causes the viscous fluid to be pumped through passages formed within the housing. Hydraulic resistance to this pumping action resists the free rotation of the unit for causing torque to be transferred from the input to the output.

13 Claims, 4 Drawing Sheets 5,456,642

GEARED TRACTION UNIT

BACKGROUND OF THE INVENTION

The present invention relates generally to power transfer systems for controlling the distribution of drive torque between the front and rear wheels of a four-wheel drive vehicle. More particularly, the present invention is directed to an improved geared coupling that is operable for varying the amount of torque transferred as a function of a rotational speed differential applied thereto.

In view of increased consumer popularity in four-wheel drive vehicles, a plethora of power transfer systems are currently being utilized in vehicular driveline applications for directing power (i.e., drive torque) to the non-driven wheels of the vehicle. In "part-time" power transfer systems, a transfer mechanism is incorporated into the driveline which is normally operable in a two-wheel drive mode for delivering drive torque to the driven wheels. In addition, such transfer mechanisms typically include a mechanical "mode" shift mechanism which can be selectively actuated by the vehicle operator for rigidly coupling the non-driven wheels to the driven wheels for establishing a four-wheel drive mode.

Alternatively, it is known to utilize "full-time" power transfer systems for continuously directing drive torque to both sets of wheels. Typically, the transfer mechanism used in such full-time systems is equipped with an inter-axle differential for permitting speed differentiation between the front and rear axles so as to prevent potentially damaging torque build-up in the driveline. In addition, it is also common to provide a "lock-out" or brake mechanism (i.e., a differential brake) for selectively or automatically inhibiting such differential action across the inter-axle differential, thereby effectively coupling the front and rear axles in a part-time four-wheel drive mode. In some systems, the lock-out mechanisms must be selectively actuated by the vehicle operator upon the vehicle encountering a low traction road surface. However, some full-time systems are equipped with a viscous coupling or an electronically-controlled clutch mechanism for automatically locking-out the inter-axle differential during certain low traction conditions.

A third type of power transfer system is commonly referred to in the industry as an "on-demand" system. In general, "on-demand" systems are operable to automatically direct power to the non-driven wheels, without any input or action on the part of the vehicle operator, when traction is lost at the driven wheels. Modernly, the "on-demand" feature includes installation of a torque transmission device, such as a viscous coupling or an electronically-controlled clutch assembly, between the driven and non-driven axles. In either case, the amount of drive torque transferred to the non-driven axle is a function of the speed differential (i.e., slip) between the driven and non-driven axles.

As is readily apparent from the foregoing, modern power transfer systems are commonly equipped with some type of multi-plate clutch or coupling apparatus for use as an automatically-controlled differential brake or an on-demand torque transmission device. As will be appreciated, the expense and complexity associated with most electronically-controlled clutch assemblies limits their application to only the most expensive four-wheel drive vehicles. Accordingly, viscous couplings have been widely used in such vehicular applications. A torque curve for a typical viscous coupling at ambient temperature is shown in FIG. 4 and is labeled "Prior Art Viscous Coupling". A characteristic of the viscous copling is that as the operating temperature increases, due to increases in ambient temperature but primarily due to heating of the viscous fluid as a result of the work imparted on it, the torque transfer characteristics of the viscous coupling changes. In addition, some viscous couplings take advantage of the "hump" effect and other improvements to increase torque output. A torque curve for such a viscous coupling operating at normal operating temperatures is shown in FIG. 4 and is labelled "Prior Art Viscous Coupling With Hump Effect". However, to improve vehicle handling and driveability, it is desirable to have a torque transmission device which produces a progressive, or "speed sensitive", increase in torque output over a range of rotational velocity differences and operating temperatures.

In this regard, Müller and Witte in their paper PDS (Porsche Dynamic Slip Control Clutch)—A New Inter-Axle Coupling Device for 4WD—Cars, SAE Paper No. 880698, describe an "on-demand" coupling device (the PDS device) capable of delivering progressive torque output in response to an increasing speed differential between the driven axle and non-driven axle. In general, the PDS device is essentially a modified dual-sun planetary gear mechanism that is operably associated with a centrifugal brake. The PDS device has an input sun gear coupled for rotation with the driven axle and an output sun gear coupled for rotation with the non-driven axle. Under normal driving conditions when there is little or no difference in the rotational velocity between the axles, the PDS device does not transfer torque to the non-driven wheels. That is, the vehicle is operating in a two-wheel drive mode. However, when the driven axle slips causing a difference between the driven and non-driven axle rotational velocities, a planet carrier is caused to rotate at relatively high velocity. However, this rotation is resisted by the centrifugal brake that is coupled to the planet carrier and which is adapted to engage a braking surface fixed to a stationary wall portion of the power transfer device housing. With the planet carrier thus restrained, torque is progressively transferred "on-demand" via the planet gears from the input sun gear to the output sun gear for delivering torque to the non-driven wheels. One disadvantage associated with the PDS device is its use of the centrifugal brake to control the torque transfer. More specifically, by incorporating a centrifugal brake the PDS device requires modification to the power transfer device housing, the introduction of additional parts and assembly steps to the power transfer device, and the potential for increased maintenance when the centrifugal brake friction elements begin to wear. An additional disadvantage of the centrifugal brake is that in reacting the torque into the housing, the PDS drive is generally incompatible with anti-lock braking systems (ABS).

SUMMARY OF THE INVENTION

Accordingly, the present invention is directed to an improved torque transfer coupling which, while providing the desirable "speed sensitive" torque output over a range of temperatures, is readily adaptable to existing power transfer mechanisms or is directly substitutable in power transfer mechanisms presently using viscous couplings. As a related object, the improved torque transfer coupling of the present invention is adapted for use as a differential brake for an inter-axle differential or as an "on-demand" torque transmission device and is compatible with ABS.

The improved coupling of the present invention is a geared torque transfer device having a planetary type gear arrangement disposed within a sealed housing that is filled with a viscous fluid. In operation, rotation of the planet gears within the housing in response to a speed differential between the input and output members causes the viscous fluid to be forcibly pumped through passages formed within the housing. Hydraulic resistance to such pumping action is adapted to resist the free rotation of the device, thereby causing torque to be transferred between the input and output members as a function of the differential speed therebetween.

BRIEF DESCRIPTION OF THE DRAWINGS

Further objects, features and advantages of the present invention will be apparent from studying the following written description and the appended claims, taken in conjunction with the accompanying drawings in which:

DETAILED DESCRIPTION OF THE INVENTION

Figure 1:
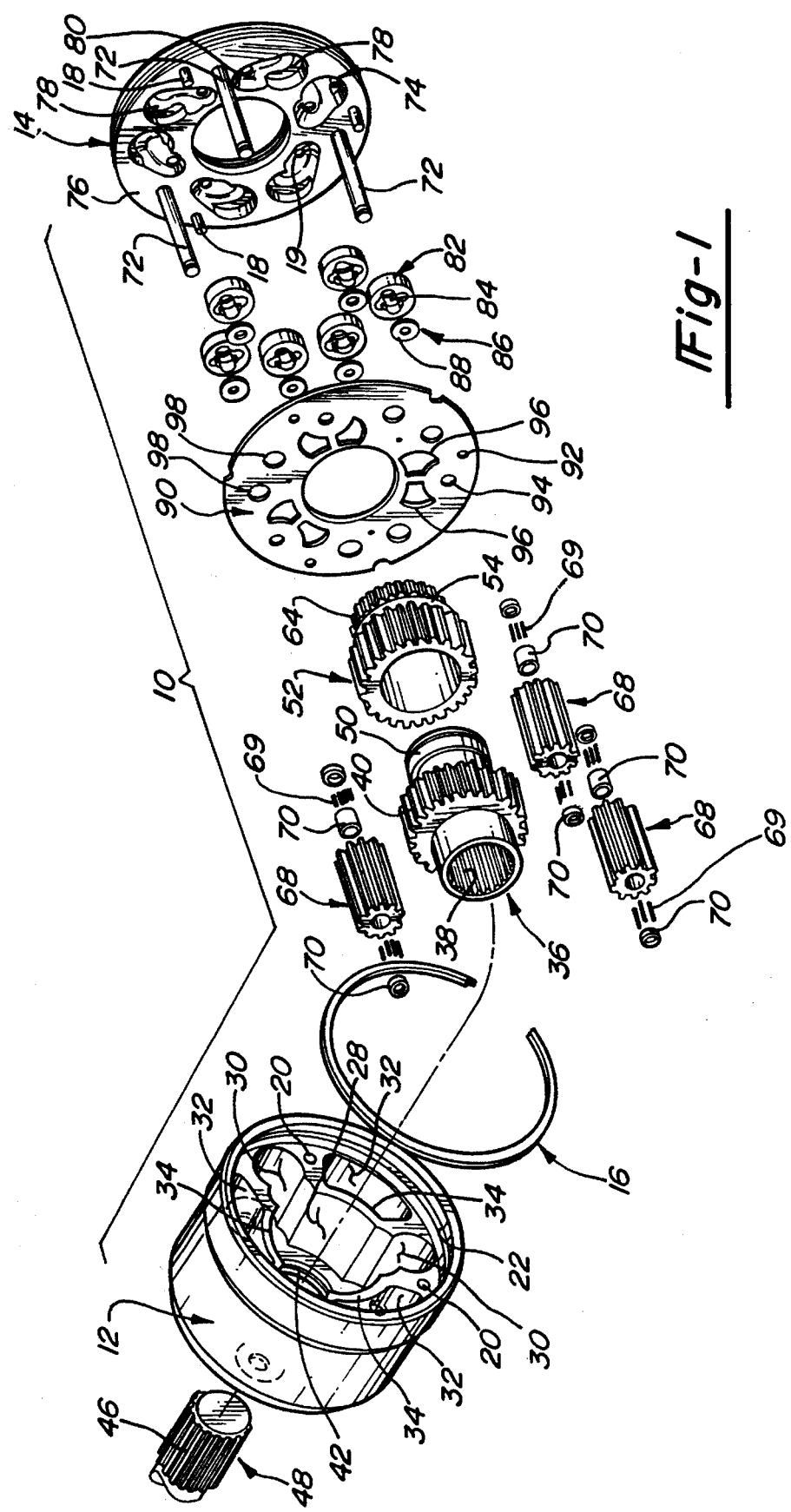
FIG. 1 is a exploded assembly view of the geared coupling unit of the present invention.

In general, the present invention is directed to providing a geared torque transfer coupling for use in motor vehicles, and particularly, in four-wheel drive application as an inter-axle differential brake or an "on demand" torque transmission device. In either case, the geared torque transfer device of the present invention is adapted to instantaneously and automatically improve the tractive characteristics of the four-wheel drive vehicle in response to a loss of traction. It should be understood from the outset, however, that the invention is not so limited and those skilled in the art will appreciate that its teachings can be used in a much broader spectrum of vehicular applications (i.e., intra-axle differential) than those expressed herein.

With particular reference to the drawings, a preferred embodiment of the present invention is shown. More particularly, a geared coupling hereinafter referred to as geared traction unit (GTU) 10, is shown including a housing 12 and an end plate 14. End plate 14 is aligned to housing 12 by dowels 18 which engage corresponding bores 20 formed in housing 12. In addition, end plate 14 is secured to housing 12 by a snap ring 16 that is retained in a groove 22 formed in housing 12. Moreover, a seal 24 is disposed in a groove 26 formed in the outer circumference of end plate 14 for sealing end plate 14 to housing 12 in a fluid-tight manner.

Housing 12 is shown to include an enlarged central chamber 28 which communicates with three equally-spaced gear chambers 30. Each gear chamber 30 is separated by a reservoir chamber 32 which generally surround central chamber 28 and are separated therefrom by housing walls 34. An input stub shaft 36 having internal splines 38 and an integral input sun gear 40 is rotatably journalled within a bore 42 formed in housing 12 and is sealed to housing 12 by a seal 44. Drive torque from a source, such as an internal combustion engine (not shown) and delivered through a multi-speed transmission (not shown), is ultimately transmitted to GTU 10 via external splines 46 on driven shaft 48 engaging input shaft internal splines 38. As will be appreciated, driven shaft 48 is representative of any output shaft, such as the rear output shaft of a transfer case or a power take-off shaft of a front-wheel drive transaxle. To reiterate, GTU 10 is adapted for use in vehicular driveline applications, and primarily four-wheel drive vehicles, for progressively transferring torque from driven shaft to a non-driven shaft in response to the speed differential therebetween.

Input shaft 36 further includes a pilot end portion 50 onto which an output sun gear 52 is rotatably journalled. Output sun gear 52 includes an elongated tubular portion 54 having an outer surface rotatably journalled within a central bore 56 formed in end plate 14 and an inner surface rotatably journalled on pilot portion 50 of input shaft 36. In addition, seals 58 and 60 are provided for sealing tubular portion 54 to end plate 14 and pilot portion 50 to output sun gear 52, respectively. To provide means for coupling output sun gear 52 to an output or non-driven shaft 62, tubular portion 54 of output sun gear 52 is formed with external splines 64 for engaging internal splines 66 on an output shaft 62. Accordingly, torque can be transmitted to or from the other drive elements of the vehicle (not shown) via the interconnection established between driven shaft 48 and non-driven shaft 62. More particularly, sun gears 40 and 52 each mesh with a plurality of planet gears 68 which are journally supported in gear chambers 30 of central chamber 28 by needle bearings 69 separated by spacers disposed about pins 72 extending from end plate 14. Moreover, the distal end of each pin 72 is adapted for receipt in a bore 71 formed through housing 12 within radial gear chambers 30 and are sealed therein via seal member 73. In the preferred embodiment, input sun gear 40 has thirty-three (33) teeth, output sun gear 52 has thirty-six (36) teeth and each planet gear 68 has fourteen (14) teeth. Meshed engagement between planet gears 68 and input sun gear 40 and output sun gear 52 is accounted for by operating planet gears 68 at different pressure angles with respect to each sun gear.

Figure 3:
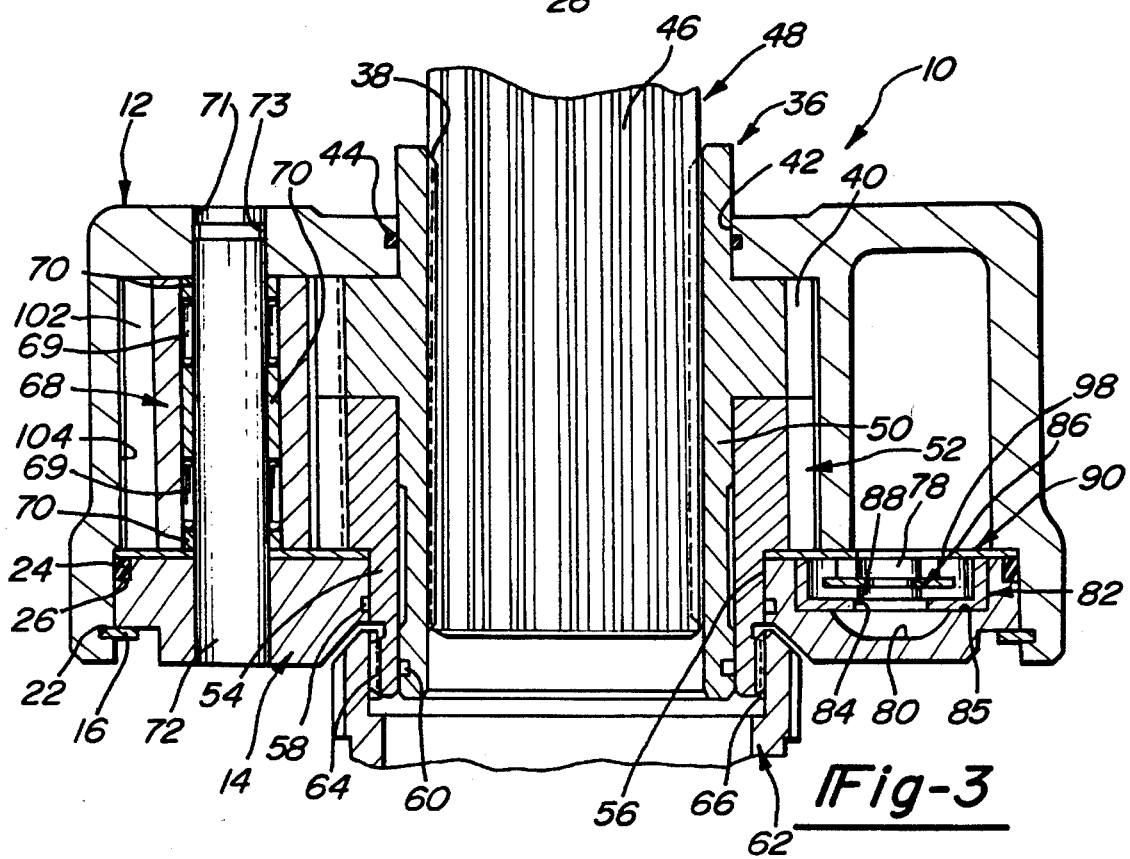
FIG. 3 is sectional view of the geared coupling unit taken along line 3—3 of FIG. 2.

With particular reference to FIGS. 1 and 3, end plate 14 is shown having a plurality of recesses 74 formed in its inner surface 76. In particular, each recess 74 includes a cylindrical pocket 78 and a generally crescent-shaped trough 80. As best seen in FIG. 3, each trough 80 extends deeper into surface 76 and thus below its cylindrical pocket 78 so as to communicate therewith. Disposed within cylindrical pocket 78 of each recess 74 is a valve insert 82 having formed therein an aperture 84 and a circular seat 85 for seating a washer-like orifice plate 86 thereon. Each orifice plate 86 is constructed from a generally flat piece of material and has an aperture 88 formed therein for defining a flow path restriction. Positioned adjacent surface 76 is a separator plate 90 having a first series of alignment bores 92 for receiving dowel pins 18 and a second series of alignment bores 94 for receipt of pins 72. In addition, separator plate 90 further includes a plurality of flow apertures 96 that provide a fluid flow pathway between a gear chamber 30 and adjacent troughs 80, and a second plurality of flow apertures 98 that provide a fluid flow pathway between a reservoir chamber 32 and adjacent cylindrical pockets 78. Thus, once assembled, separator plate 90 retains valve inserts 82 in their seated position within circular pockets 78 of recesses 74 such that flow apertures 98 are generally aligned with apertures 88 in washer-like plates 86 and apertures 84 in valve insert 82. Likewise, flow apertures 96 are generally aligned with portions of troughs 80. Following assembly, central chamber 28, gear chambers 30 and reservoir chambers 32 are filled with a predetermined amount of viscous fluid. It is important that the chambers are sufficiently filled such that the gears are kept immersed with viscous fluid. A plurality of fluid filling apertures 19 are provided to facilitate filling GTU 10 with viscous fluid. If a viscous fluid other than that used within the torque transfer device is to be used, filling apertures 19 may be sealed with suitable plug means (not shown) for hermetically sealing GTU 10 and maintaining separation of the fluids. In the preferred embodiment, however, the filling apertures are left open and fluid within the transfer case, transmission or other torque transfer device, such as automatic transmission fluid or motor oil, is allowed to flow into and out of the unit during operation. Thus, the GTU of the present invention eliminates the need for special, and often expensive, viscous fluids used in viscous couplings.

Figure 2:
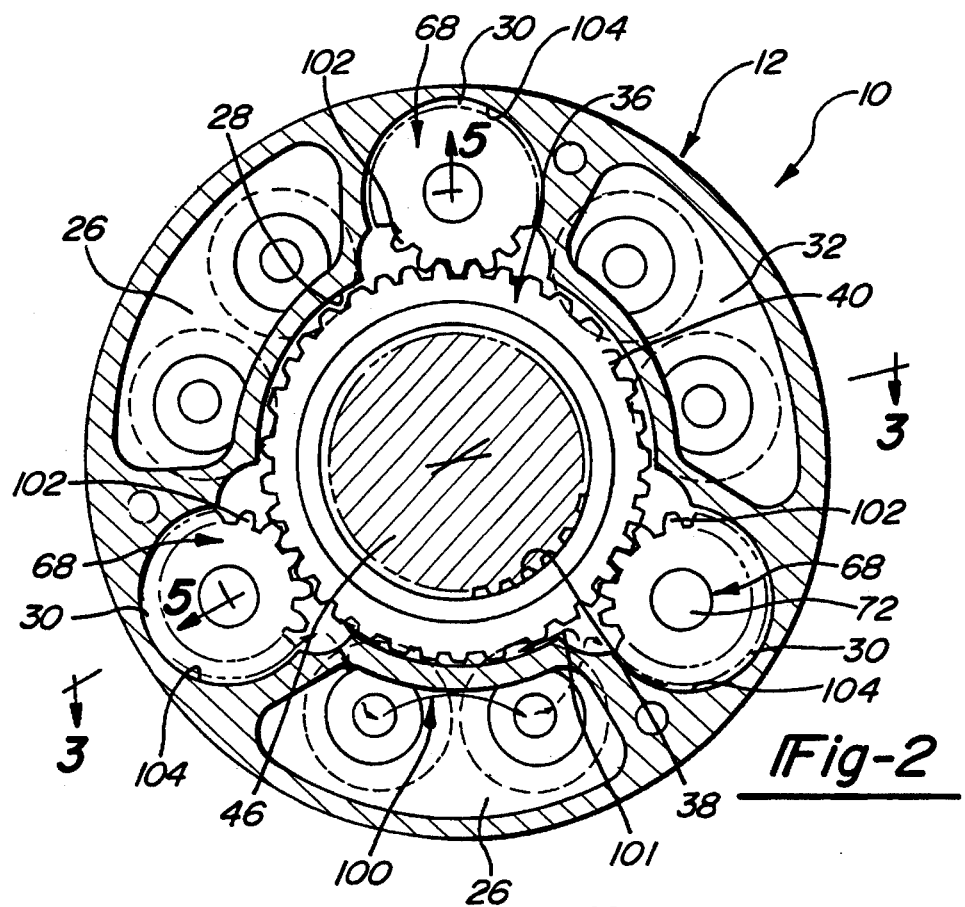
FIG. 2 is a top sectional view of the geared coupling unit of the present invention.
Figure 5:
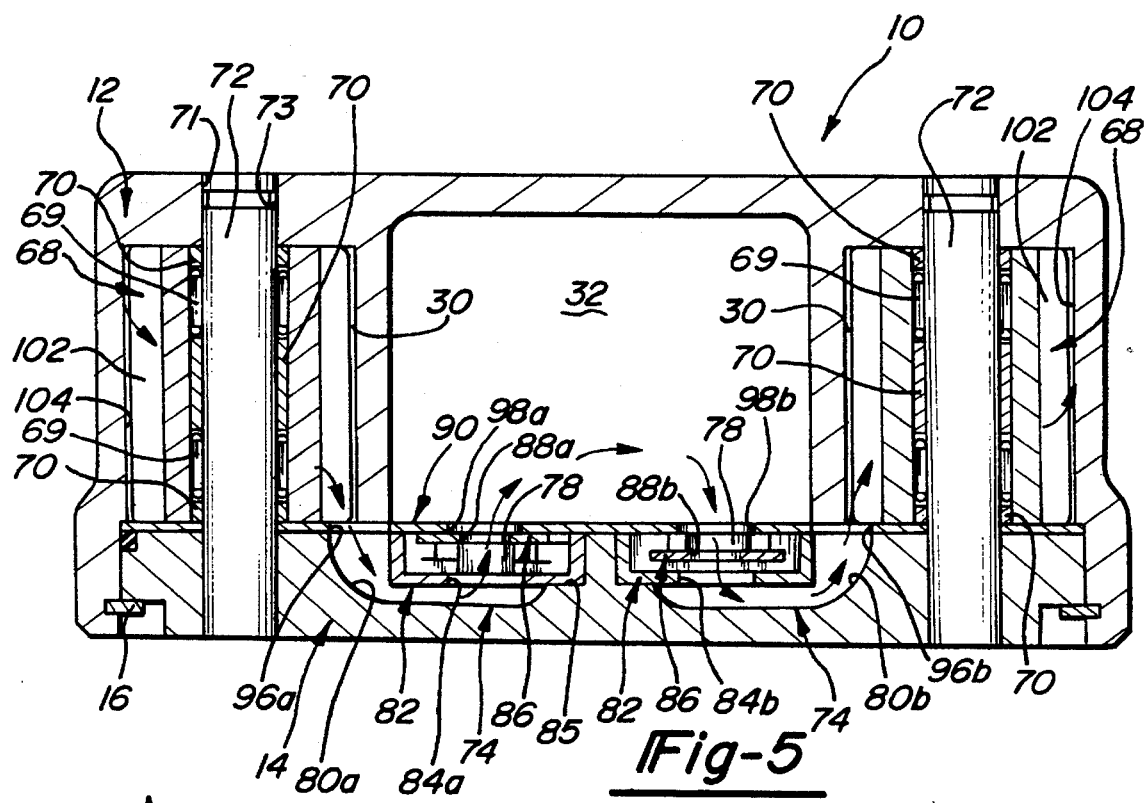
FIG. 5 is a sectional view, taken along line 5—5 of FIG. 2, which illustrates the fluid flow path through the geared coupling unit of the present invention.

The above described elements of GTU 10 define an internal fluid flow path generally indicated by arrows 100 (FIGS. 2 and 5) for permitting flow between gear chambers 30 (and central chamber 28) and reservoir chambers 32, the direction of flow being dependent on the direction of planet gears 68 which, in turn, is dependent on the direction of the speed differential between sun gears 40 and 52. Arrows 100 are directed to indicate flow for counterclockwise rotation of planet gears 68. It will be appreciated that the direction of arrows 100 would be reversed for clockwise rotation of planet gears 68. The path is symmetrical with respect to each reservoir chamber 32 having two mirror-imaged recesses 74 corresponding thereto. Best seen in FIG. 5, two cylindrical pockets 78 are directly adjacent each reservoir chamber 32 with troughs 80 extending from cylindrical pockets 78 toward adjacent planet gears 68. When caused to rotate, each planet gear 68 carries fluid via its gear teeth 102 along a peripheral wall portion 104 of its radial gear chamber 30. As seen from arrows 100, fluid discharged from gear chamber 30 is then directed through separator plate apertures 96a into troughs 80a and from there the fluid flows through valve insert aperture 84a, orifice plate aperture 88a, through separator plate flow aperture 98a and into reservoir chamber 32. As stated, the flow path is symmetrical and continuous. Thus, fluid flows out of reservoir chamber 32 through separator plate flow aperture 98b, orifice plate aperture 88b, valve insert aperture 84b, trough 80b, and separator plate flow aperture 96b to the entry side of the adjacent planet gear 68. Since the fluid flow path is circuitous, the fluid flows in the above described manner from planet gear to planet gear. Again, it should be further appreciated, that fluid may flow in either direction depending on the direction of rotation of planet gears 68. Arrows 101 indicate that a small amount of flow is carried by sun gears 40 and 52 along walls 34 which further contributes to torque transfer.

In operation, when input shaft 36 is driven at approximately the same rotational velocity as output shaft 62, GTU 10 rotates as a unit at approximately the same rotational velocity as the input and output shafts and no torque is transferred between input sun gear 40 and output sun gear 52, and likewise, from the input shaft 36 to output shaft 62. However, when the rotational velocities of input shaft 36 and output shaft 62 differ, GTU housing 12 is set into very rapid rotation based upon an approximately 11:1 ratio between the GTU housing 12 and input sun gear 40 and a 12:1 ratio between GTU housing 12 and output sun gear 52. Such rotation of GTU 10 in response to a speed differential between input shaft 36 and output shaft 62 is resisted by the above-described internal fluid pumping action. Input torque from sun gear 40 is therefor reacted into the viscous fluid and the result is torque transfer to output sun gear 52. Moreover, as planet gears 68 rotate, fluid is pumped in the closed circuit fluid path previously described, this pumping action providing hydraulic resistance to the free rotation of GTU housing 12 and thus a torque transfer between input shaft 36 and output shaft 62. The greater the magnitude of the speed differential between input shaft 36 and output shaft 62, the greater the rotational velocity of GTU 10 and planet gears 68 which, in turn, increases the amount of fluid which is pumped.

Figure 4:
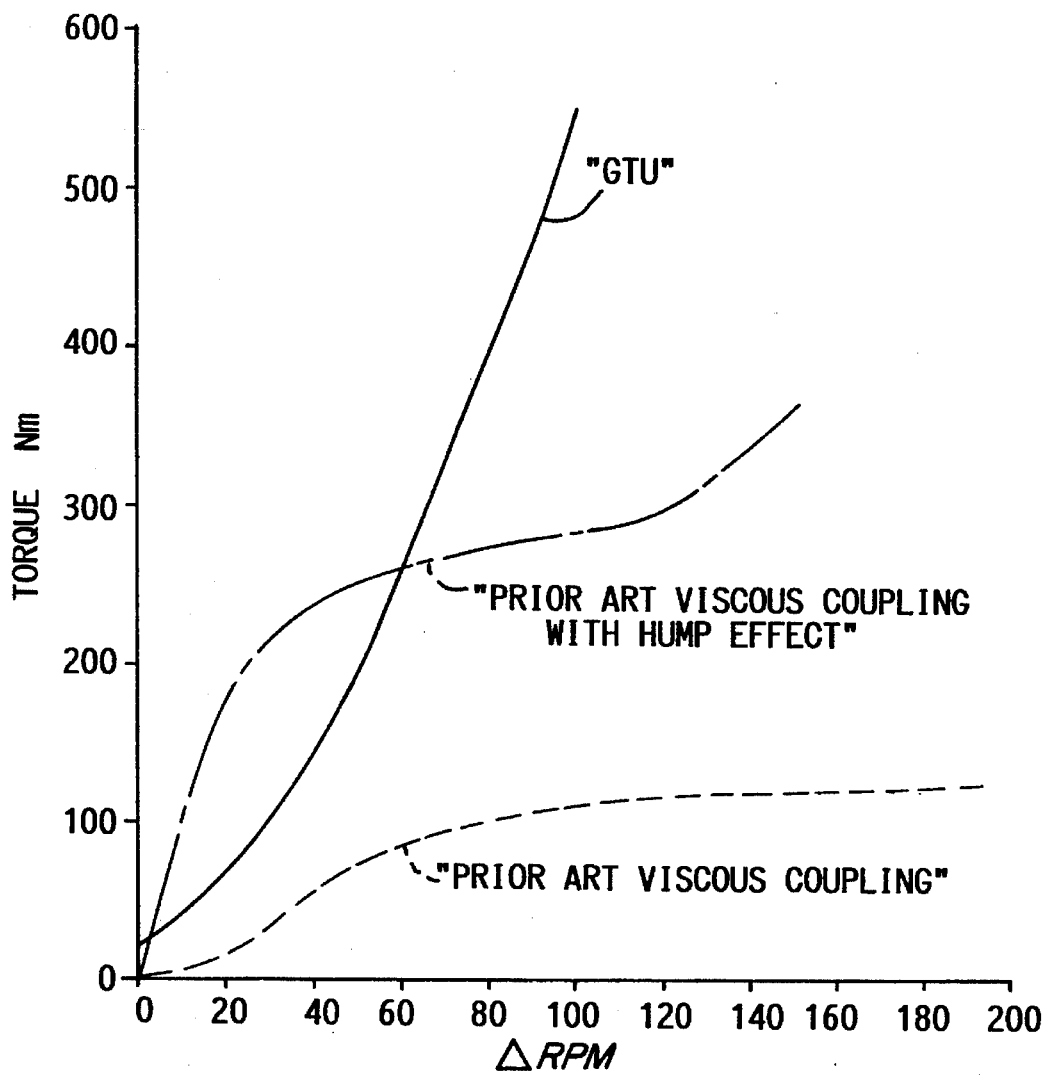
FIG. 4 graphically illustrates the torque transmission characteristics of a prior art viscous coupling, a prior art viscous coupling incorporating hump effect, and the geared coupling unit of the present invention.

As is known in the fluid pumping art, the torque required to pump a viscous fluid is proportional to the mass flow rate and velocity of the fluid being pumped. Thus, as the difference in rotational velocity between input shaft 36 and output shaft 62 increases, and likewise the rotational velocity of GTU 10 increases, then GTU 10 attempts to pump more fluid. Pumping more fluid faster requires greater torque input and thus creates greater resistance to rotation of GTU 10 and, hence more torque transfer between input shaft 36 and output shaft 62. FIG. 4 provides a graphical representation of the progressive, speed-sensitive, torque transfer based upon the difference in rotational velocity between input shaft 36 and output shaft 62 of GTU 10.

Figure 6:
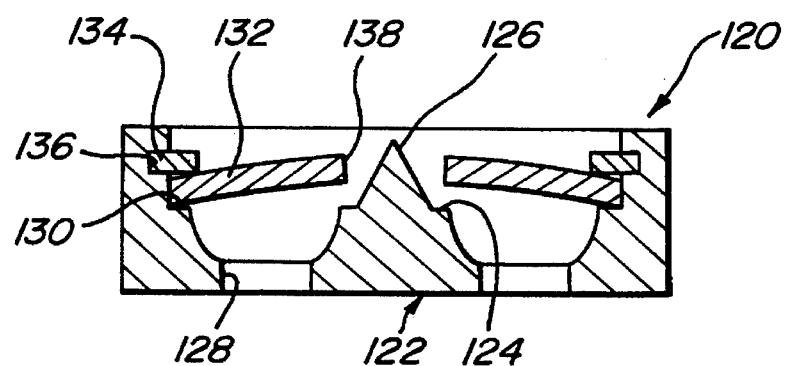
FIG. 6 is a partial sectional view of the geared coupling unit illustrating an alternative embodiment for the orifices disposed within the fluid flow path and which provides a further modified torque output.

With reference to FIG. 6, an alternative embodiment for the valve insert and orifice plate of GTU 10 is shown. The modified valve insert 120 includes a center formation 122 defining a central seat 124 and a pintle 126. Valve insert 120 further includes a plurality of fluid passages 128 and an outer seat 130 onto which an orifice plate 132 is positioned. A retainer 134 engages a groove 136 formed in valve insert 120 for retaining orifice plate 132 against outer seat 130. Orifice plate 132 is modified in that it is formed with a convex shape and has a center aperture 138 through which pintle 126 projects. Under low fluid flow and low fluid pressure conditions, fluid flows around pintle 126 and through center aperture 138, through passages 128 and through the remaining fluid flow path as previously described. As fluid flow and pressure increases, in response to an increase in the differential rotational velocity, orifice plate 132 flattens for reducing the fluid flow through central aperture 138. Further pressure increases cause orifice plate 132 to completely flatten against inner seat 124 and fluid flow is cut-off. When the fluid flow is cut off, GTU 10 becomes hydraulically locked resulting in direct torque transfer between input shaft 36 and output shaft 62. As noted, the symmetrical arrangement of the fluid flow path conveniently provides for restricting fluid flow in either direction based upon the direction of rotation of GTU 10.

Figure 7:
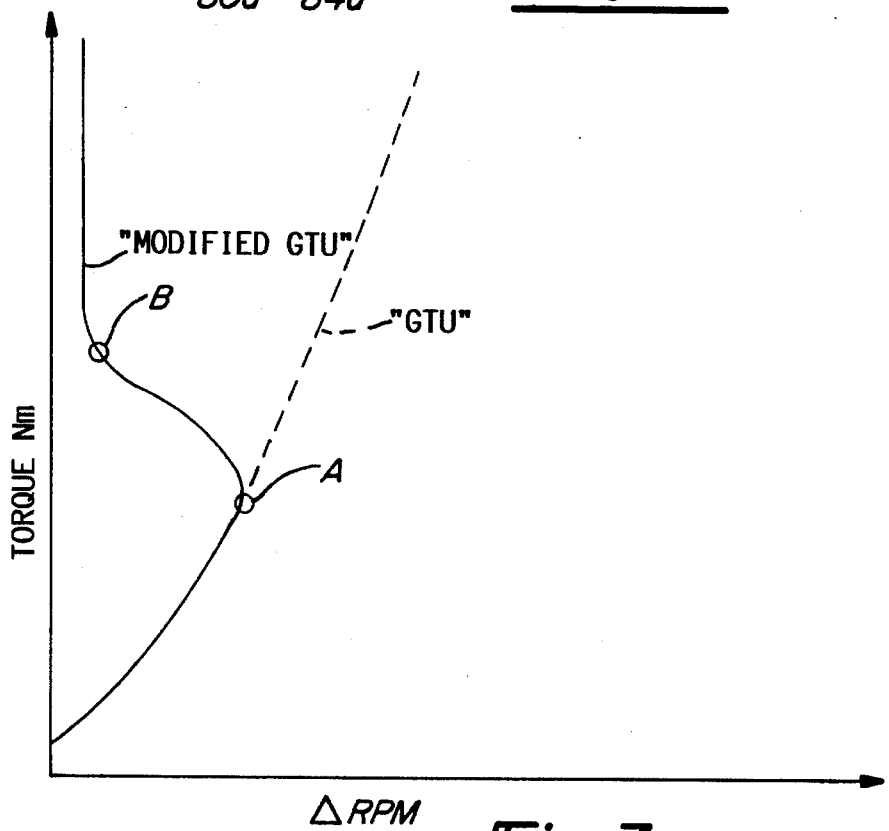
FIG. 7 is a graphical illustration of the torque transmission characteristics for a geared coupling unit incorporating the orifices according to the alternative embodiment of FIG. 6.

The torque output of a GTU 10 incorporating modified valve insert 120 and orifice plate 132 of the second embodiment is shown graphically in FIG. 7. Note that the torque transfer for small differences between input and output rotational velocity is very similar to the unmodified GTU 10. However, at point "A", the fluid pressure within GTU 10 has increased sufficiently to cause orifice plate 132 to begin to flatten thereby restricting fluid flow. As a result, the restricted fluid flow causes more torque to be transferred at lower rotational velocity differences and the net rotational velocity difference between the input and output shafts decreases. At point "B" orifice plate 132 has completely flattened cutting off fluid flow such that GTU 10 becomes hydraulically locked, whereby nearly direct torque transfer takes place. Because there is some leakage of fluid within GTU 10, a small difference in rotational velocity remains.

As can be appreciated from the foregoing discussion, the torque output characteristics of GTU 10 can be easily modified by simply changing the valve inserts, orifice plates or both. Thus GTU 10 may be tuned for specific torque transfer applications. Further, the orifices may be eliminated or closed off entirely if care is taken to machine gear chambers 30 such that the clearance between gear teeth 102 and peripheral walls 104 is very small. In this situation, GTU housing 12 itself acts as the fluid flow path and the restriction for resisting fluid flow and thereby transferring torque.

Specific embodiments of the invention have been shown and described in detail to illustrate the principles of the present invention. It will be understood that the invention may be embodied in other forms without departing from such principles and the fair scope of the present invention.

What is claimed is:

1. A geared torque transfer device comprising;

a housing;

an input sun gear rotatably supported in the housing;

an output sun gear rotatably supported in the housing;

a plurality of planet gears rotatably supported in the housing and in mutual engagement with the input and output sun gears;

a quantity of viscous fluid disposed with the housing;

means for defining a fluid flow path such that rotation of the planet gears causes the viscous fluid to flow through the fluid flow path; and means for restricting the free flow of fluid through the flow path thereby creating resistance to the rotation of the planet gears and housing in response to differences in rotational velocity of the input and output sun gears whereby torque is transferred between the input and output sun gears.

2. The torque transfer device of claim 1 wherein the input sun gear has a different number of gear teeth than the output sun gear.

3. The torque transfer device of claim 1 wherein the flow restriction means comprises an orifice plate.

4. The torque transfer device of claim 1 wherein the fluid flow path is circuitous.

5. The torque transfer device of claim 1 wherein the flow restriction means further comprises means for cutting off fluid flow in response to fluid flow pressure.

6. The torque transfer device of claim 5 wherein the means for cutting of fluid flow comprises a convex orifice plate disposed adjacent a seat, the orifice plate responsive to fluid flow pressure to flatten against the seat thereby cutting off fluid flow.

7. The geared torque transfer device of claim 1, wherein the housing includes a gear chamber and a reservoir chamber; and the means for defining a fluid flow path provides fluid communication between the gear chamber and the reservoir chamber.

8. The geared torque transfer device of claim 7, wherein the gear chamber comprises a central chamber having the input and output sun gears rotatably supported therein; and a plurality of planet gear chambers, each planet gear chamber having one of the plurality of planet gears rotatably supported therein.

9. The torque transfer device of claim 2, wherein the input sun gear and the plurality of planet gears operate at different pressure angles from the output sun gear and the plurality of planet gears for accommodating mutual engagement between the input sun gear, the output sun gear and the plurality of planet gears.

10. The torque transfer device of claim 1, wherein the means for defining a fluid flow path comprises an end plate having a recess formed therein; and the means for restricting the free flow of fluid comprises a valve disposed within the recess.

11. The torque transfer device of claim 10, wherein the valve comprises a valve insert having a seat formed thereon and a plate disposed on the seat and having an orifice therethrough.

12. The torque transfer device of claim 11, wherein the valve insert further comprises a pintle partially disposed within the orifice and the plate being flexible and cooperating with the pintle for varying the fluid flow in response to the fluid pressure.

13. A geared torque transfer device comprising:

a housing having a gear chamber, a reservoir chamber and an end plate, the end plate having a recess formed therein to provide a fluid flow path between the gear chamber and the reservoir chamber;

an input sun gear rotatably supported in the gear chamber;

an output sun gear rotatably supported in the gear chamber;

a set of planet gears rotatably supported in the gear chamber and in mutual engagement with the input and output sun gears;

a quantity of viscous fluid disposed within the gear chamber and the reservoir chamber;

a valve disposed in the recess for restricting the free flow of viscous fluid through the fluid flow path; and whereby rotation of the planet gears causes viscous fluid to flow through the fluid flow path and the valve restricts the viscous flow of fluid to create resistance to the rotation of the planet gears and the housing in response to differences in rotational velocity of the input sun gear and output sun gear for transferring torque therebetween.

* * * * *